H. E. PAOLUCCI.
AUTOMATIC FEEDING SELF ADJUSTING PECAN CRACKER.
APPLICATION FILED MAY 19, 1921.
1,424,675.
Patented Aug. 1, 1922.
8 SHEETS—SHEET 1.
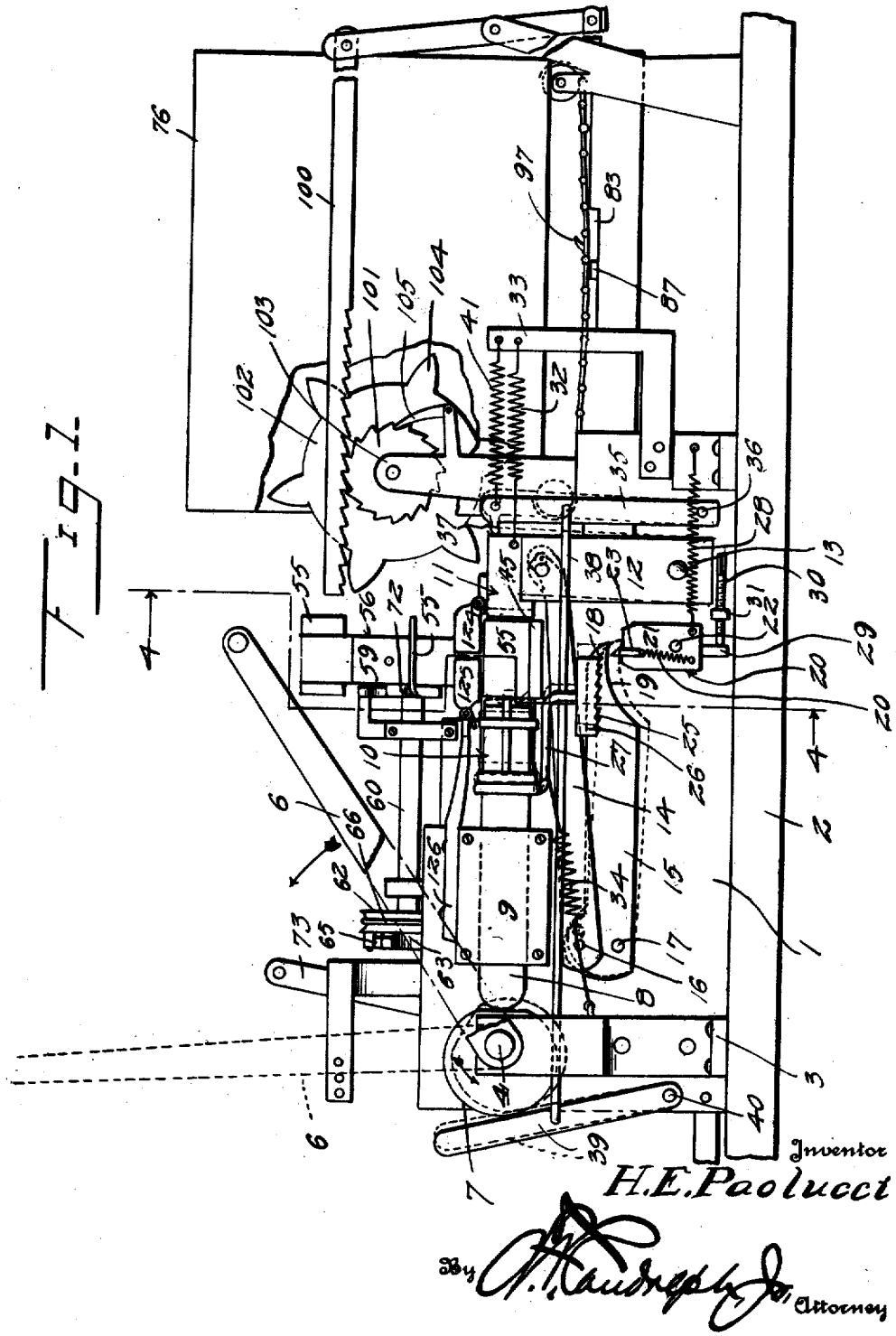

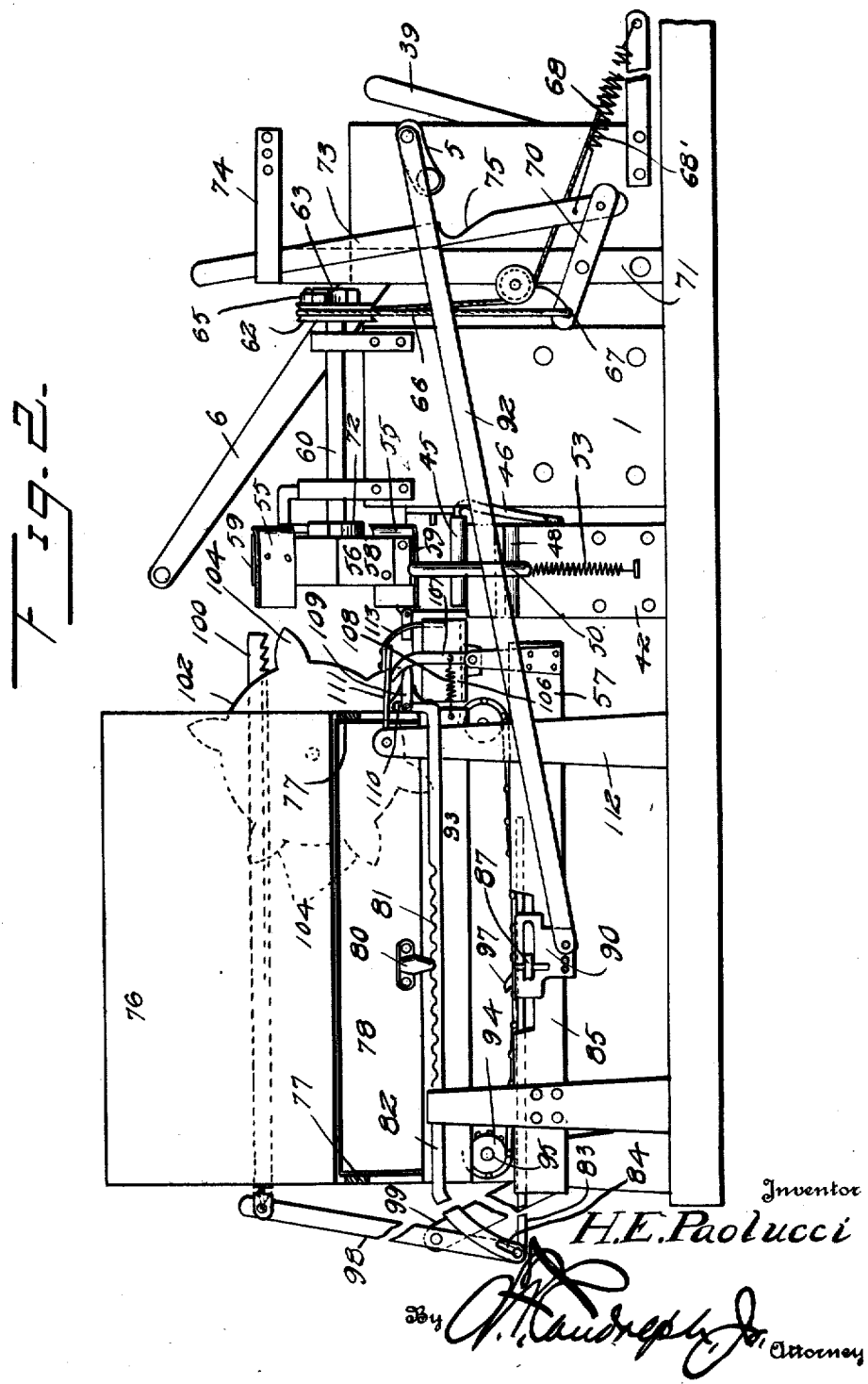

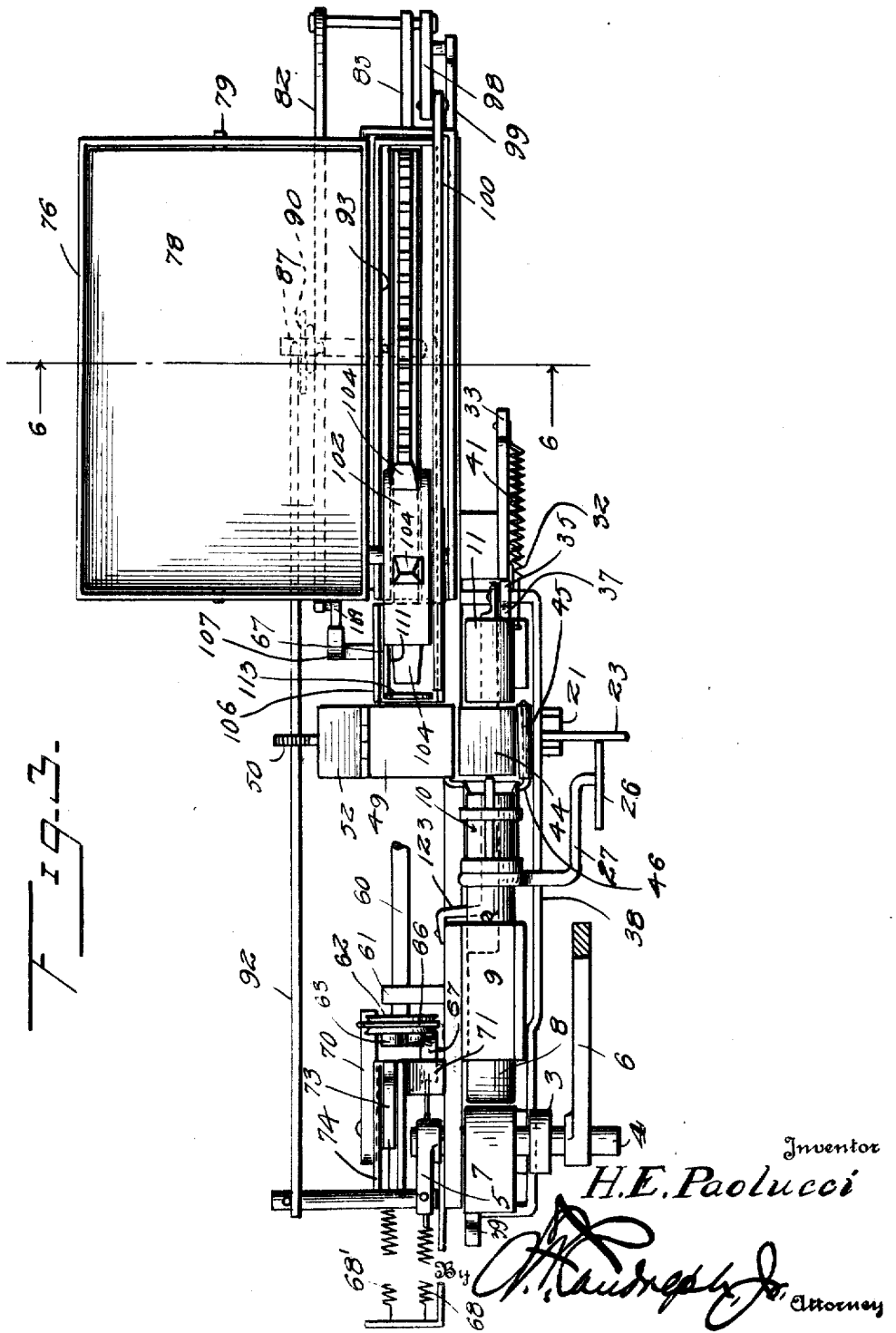

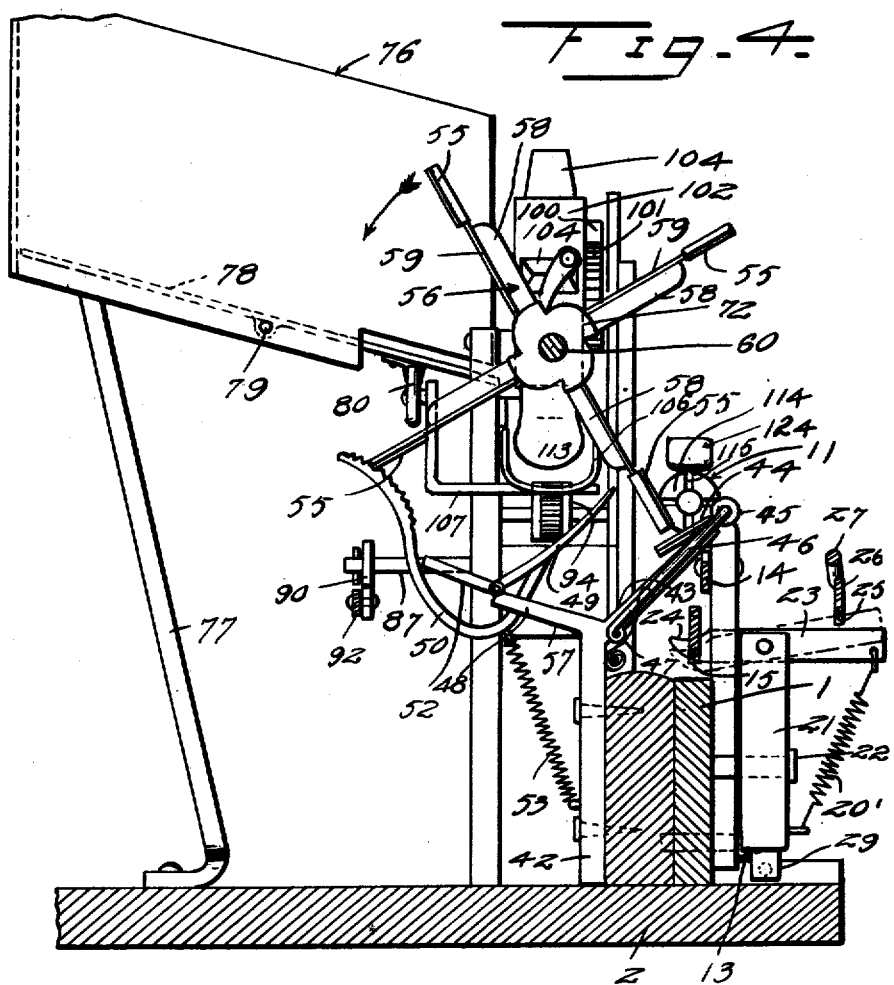
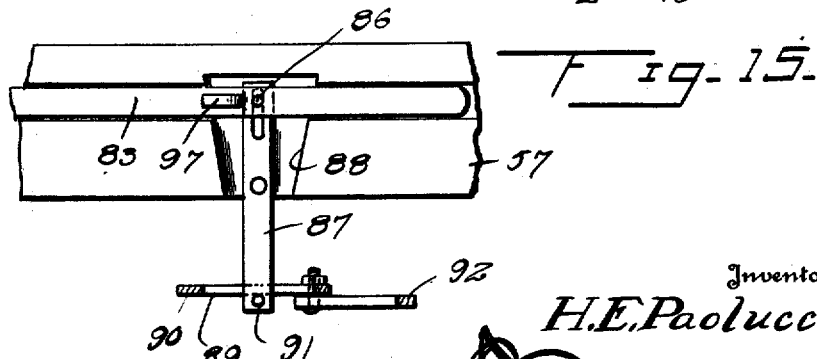

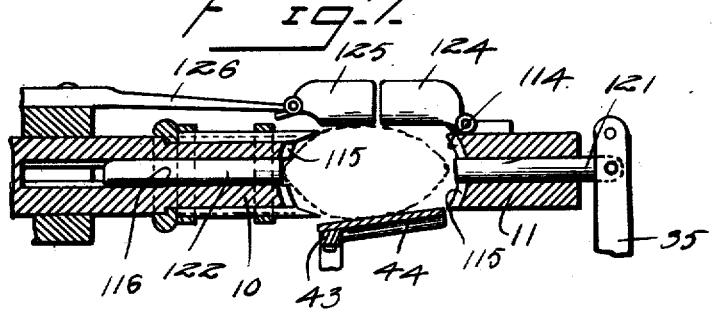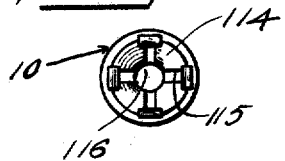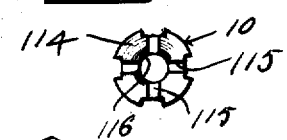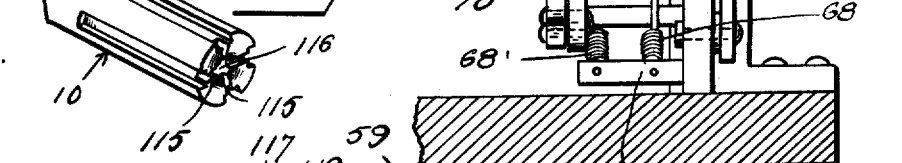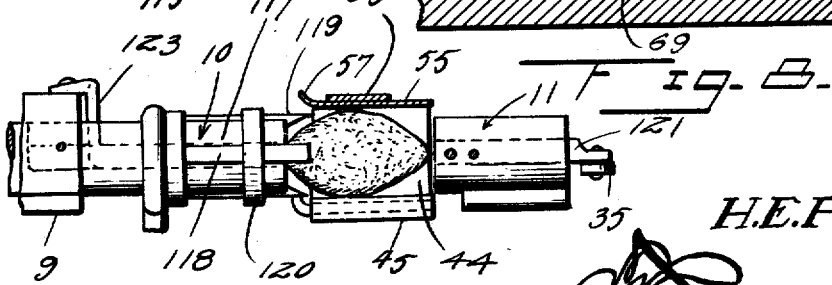

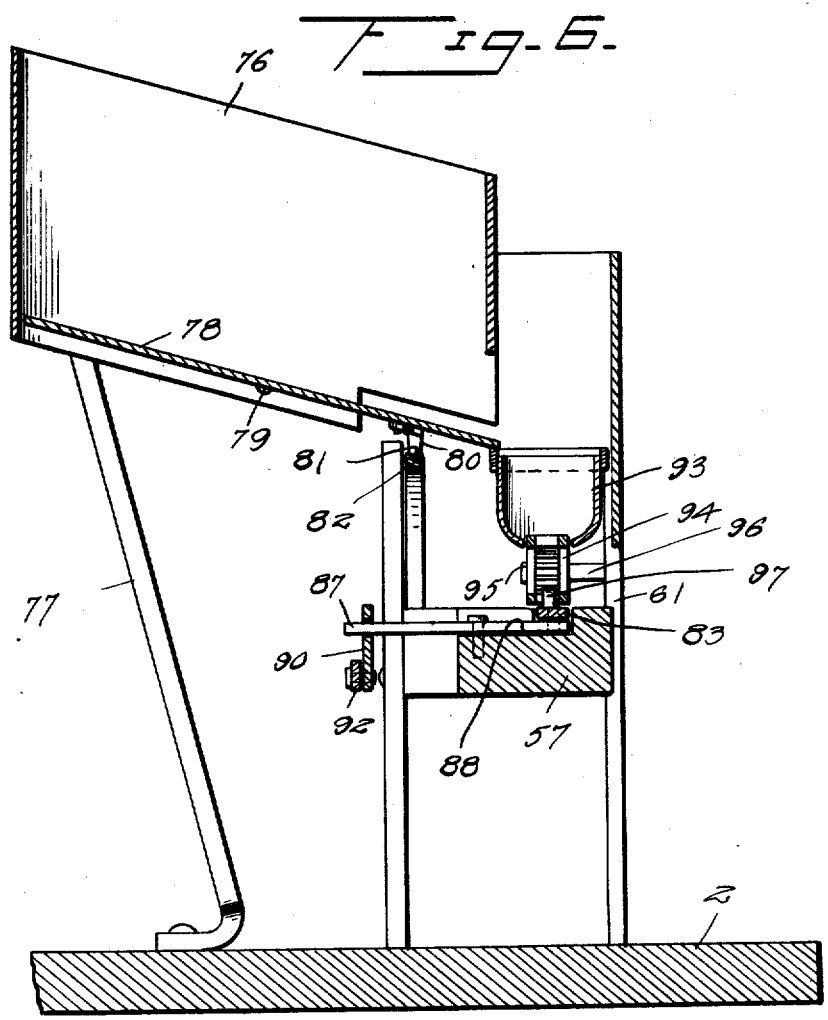
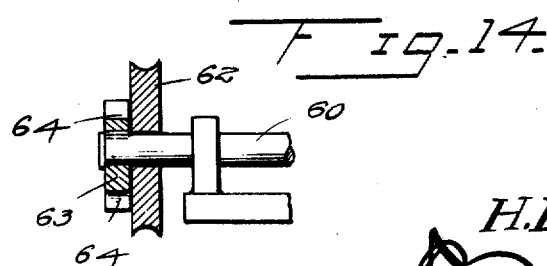

H. E. PAOLUCCI.
AUTOMATIC FEEDING SELF ADJUSTING PECAN CRACKER.
APPLICATION FILED MAY 19, 1921.
1,424,675.
Patented Aug. 1, 1922.
8 SHEETS—SHEET 7.
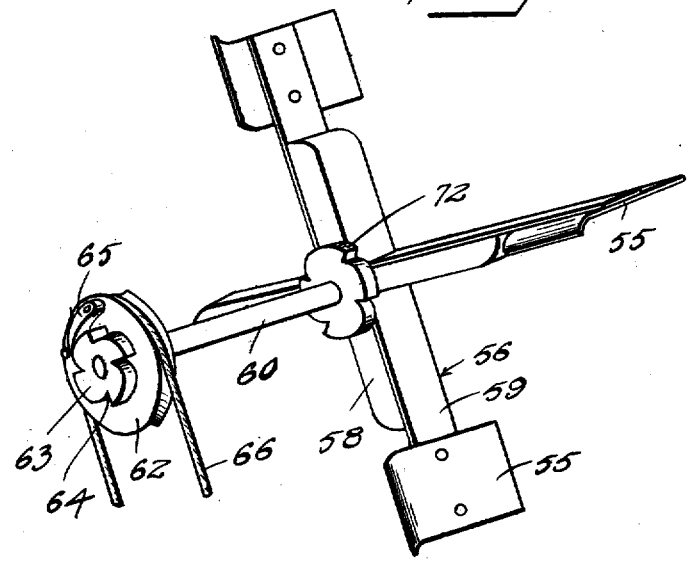
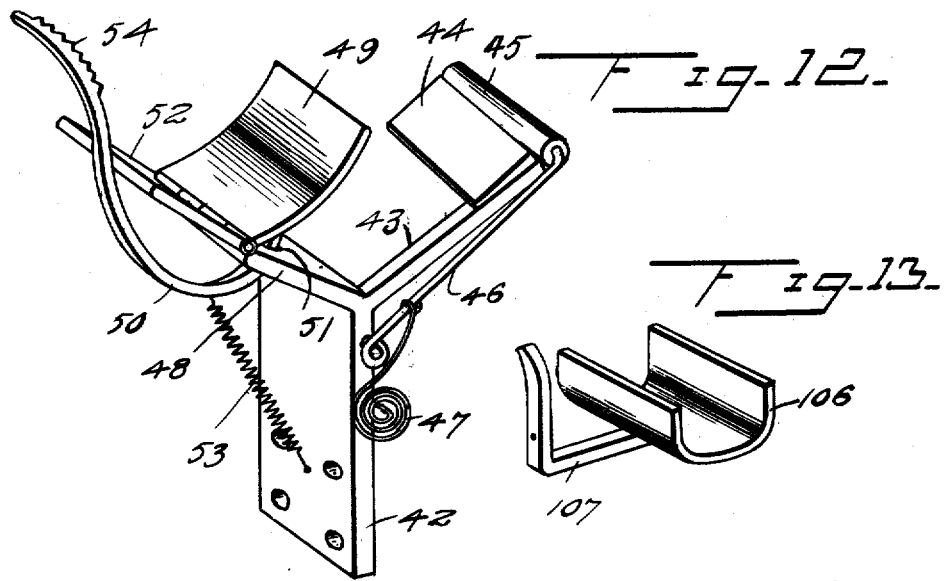
Inventor
H. E. Paolucci

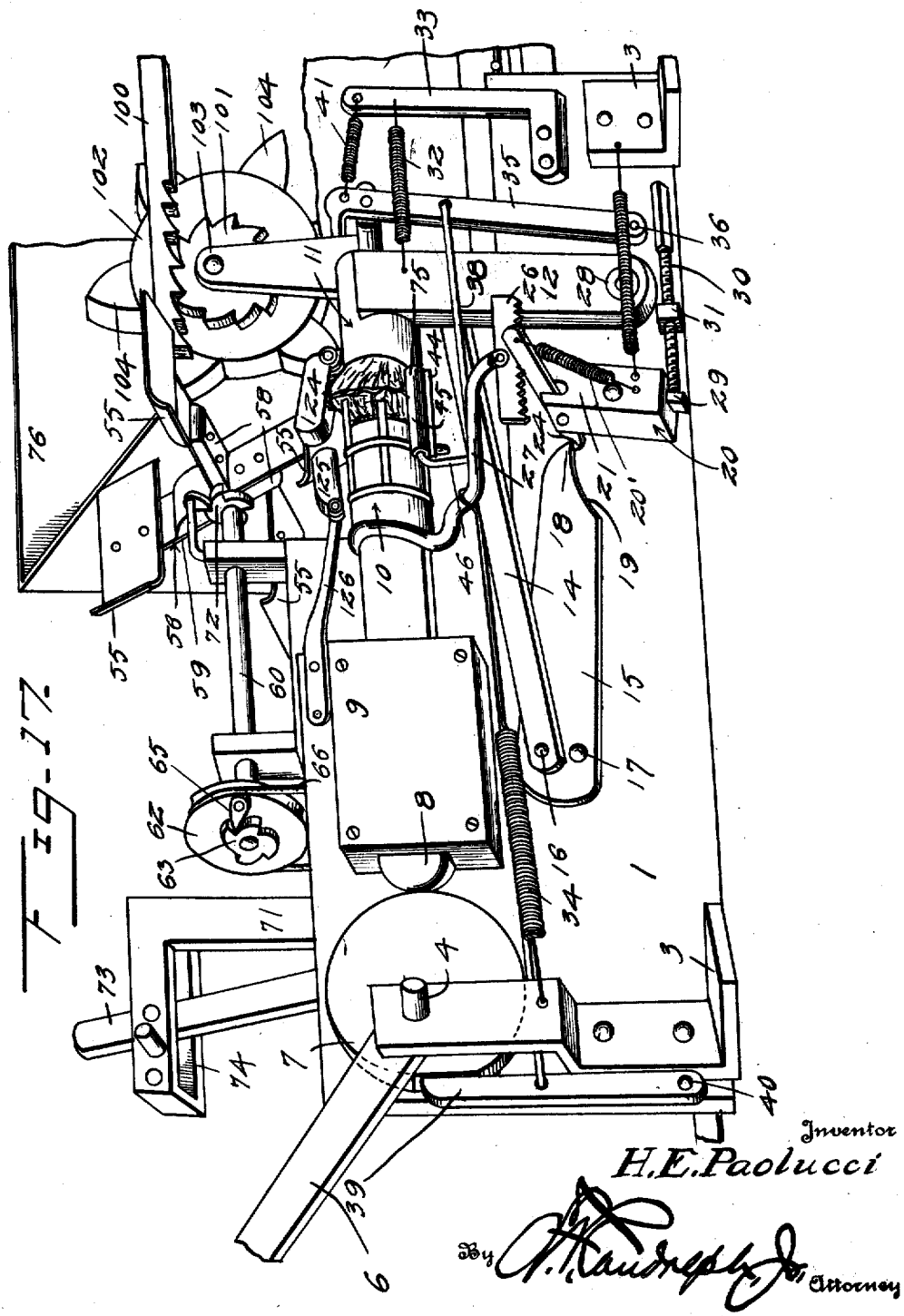

UNITED STATES PATENT OFFICE.

HENRY E. PAOLUCCI, OF SAN ANTONIO, TEXAS.

AUTOMATIC-FEEDING SELF-ADJUSTING PECAN CRACKER.

1,424,675. Specification of Letters Patent. Patented Aug. 1, 1922.

Application filed May 19, 1921. Serial No. 470,784.

*To all whom it may concern:*

Be it known that I, HENRY E. PAOLUCCI, a subject of the King of Italy, residing at San Antonio, in the county of Bexar and State of Texas, have invented certain new and useful Improvements in Automatic-Feeding Self-Adjusting Pecan Crackers; and I do hereby declare the following to be a full, clear, and exact description of the invention, such as will enable others skilled in the art to which it appertains to make and use the same.

This invention relates to new and useful improvements in nut cracking machines especially constructed to crack pecans and similar nuts and has for its primary object the provision of means for automatically placing nuts one at a time between cracking elements and to eject the cracked nut just prior to placing another nut in position to be cracked.

Another object of this invention is the provision of means whereby nuts regardless of their length will each receive the same amount of pressure to crack them, thereby obviating the danger of cracking some nuts too much and not cracking other nuts enough.

A further object of this invention is the provision of means whereby the pressure or cracking action on the nuts may be varied as desired.

A further object of this invention is the provision of a nut cracker which will be easy to operate and also may be manually operated or by a small power source.

A further object of this invention is the provision of a nut cracking machine of the above stated character, which is extremely light and may be fastened to a table or other support, and which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a nut cracking machine constructed in accordance with my invention, Figure 2 is a similar view illustrating the other side of the device, Figure 3 is a top plan view illustrating the device, Figure 4 is a transverse sectional view taken on the line 4—4 of Figure 1, Figure 5 is a fragmentary end view illustrating means for operating the device, Figure 6 is a transverse sectional view, taken on the line 6—6 of Figure 3, Figure 7 is a fragmentary vertical sectional view, illustrating the nut cracking members, Figure 8 is a fragmentary plan view partly in section illustrating the nut cracking members with a nut positioned therebetween and held there by the feed wheel, Figure 9 is an end view illustrating one of the cracking members, Figure 10 is a similar view illustrating the other cracking member, Figure 11 is a perspective view illustrating the feed wheel, Figure 12 is a similar view illustrating a transferring table, Figure 13 is a similar view illustrating a dumping table or trough, Figure 14 is a fragmentary sectional view illustrating a grooved pulley or wheel for operating the feed wheel in a step by step movement, Figure 15 is a fragmentary view partly in section illustrating a part of the means for imparting to the endless feed chain a step by step motion, Figure 16 is a fragmentary perspective view illustrating one of the nut cracking members, Figure 17 is a fragmentary perspective view illustrating the machine with the various parts in nut cracking position.

Referring in detail to the drawings, the numeral 1 indicates an elongated base detachably secured to a table or support 2 by means of brackets 3. The base 1 has journaled thereto an operating shaft 4 and the latter is located in close proximity to one of the ends of the base and adjacent the upper edge of the latter and is provided with a crank 5 at one end and an operating handle 6 at its other end. When it is desired to operate this device by a motor or other power source, the handle 6 is removed and a gear or the like substituted in lieu thereof. The operating shaft 4 has secured thereto an eccentric 7 located on an opposite side to the base 1 from the crank 5 and is engaged by a plunger 8. The plunger 8 is slidably mounted in a guide 9 secured to the base 1 and has formed on its forward end a nut cracking member 10, while its opposite end rides against the eccentric 7. The nut cracking element 10 is adapted to reciprocate in a horizontal plane owing to the mounting of the plunger 8 within the guide 9. Located in advance of the nut cracking element or member 10 is a nut cracking member 11 secured to an arm 12 which is pivoted to the base 1 as illustrated at 13. The arm 12 has pivoted thereto a rod 14 which is in turn pivoted to a depressing member 15 as illustrated at 16. The member 15 is pivoted to the base 1 as shown at 17 and has its free end reduced to form a bill 18 and an arcuate face 19. A catch 20 consisting of a block 21 is pivoted to the base as shown at 22 and has pivoted thereto a transversely extending catch member 23 which projects beyond opposite sides of the block 21 and is provided with a long end and a short end and the short end is provided with a concaved portion 24 adapted to be engaged by the concaved or arcuate face 19 of the depressing member 15 on the pivotal movement of the arm 12 to elevate the long end of the catch member 23 and the upper edge of the latter is sharpened or beveled to engage any one of a series of teeth 25 formed on a locking plate 26. The locking plate 26 is carried by an arm 27 which is in turn secured to and movable with the plunger 8. The block 21 has secured thereto a coil spring 28 which is in turn secured to the base for the purpose of normally urging the block into its initial position and with the lug 29 formed on said block into engagement with an adjusting screw 30. The adjusting screw 30 is mounted in a bracket 31 carried by the base 1 and is adapted to adjust the inclination of the block and the location of the catch member 23 in respect to the reduced end of bill portion 18 of the depressing member 15. The arm 12 is normally urged to swing forwardly of the base 1 or away from the eccentric or cam 7 by a spring 32 which is anchored to a bracket 33 carried by the base. The plunger 8 has its rear end normally urged into engagement with the cam or eccentric 7 by a spring 34 secured to the arm 27 and to the base.

An arm 35 is pivoted to the base as shown at 36 and is equipped at its upper end with a shoulder 37 adapted to engage the forward end of the nut cracking element 11 and said arm 35 also has pivoted thereto a rod 38 which is in turn pivoted to a lever 39 that rides upon the cam or eccentric 7 at a diametrically opposite point from the plunger 8 and is pivoted to the base as shown at 40. It will therefore be seen that the nut cracking element 11 will be moved in a rearward direction or towards the operating shaft 4 by the movement of the cam or eccentric 7 and moved in a forward direction by the spring 32 when the low side of the cam or eccentric is next to the lever 39. A spring 41 of a comparatively low tension is connected to the upper end of the arm 35 and to the bracket 33 for the purpose of holding the lever 39 into engagement with the periphery of the cam or eccentric 7 at all times and also to aid in moving the arm 35 on its pivot in a forward direction when permitted to move in said direction by the cam or eccentric.

A table supporting bracket 42 is secured to the base 1 adjacent to the nut cracking elements or members 10 and 11 and is provided with an integral arm 43 that extends upwardly and laterally therefrom to support a table 44 constructed of steel or any other flexible material. The table 44 is arranged between the nut cracking members 10 and 11 and is inclined from one side edge towards its other side edge and has its forward end disposed in a plane slightly higher than the rear edge or the end located adjacent to the nut cracking member 11 so that on the forward movement of the nut cracking element 10, the same rides over the table and depresses the elevated end into a plane with the lower edge of the nut cracking element 11. A roller 45 is located along the highest side edge of the table 44 and is supported by a spring arm 46 and the latter is secured to the table supporting bracket 42. The roller 45 is adapted to prevent a nut from being rolled off of the upper side edge of the table but when sufficient pressure has been placed on the nut and after the latter has been cracked, the roller 45 may move downwardly to permit the cracked nut to be ejected off of the table and the arm 46 returns the roller to its initial position as soon as the pressure is released thereon. A spring 47 is secured to the table supporting bracket 42 and has its end secured to the arm 46 for aiding in returning said arm to its initial position after the compression and release of the roller 45.

An upwardly inclined arm 48 is formed on the table supporting bracket 42 and inclined in an opposite direction from the arm 43 and has hinged thereto an arcuate shaped nut transferring table 49 and the latter has secured thereto a curved arm 50 which extends through an opening 51 in the arm 48 and upwardly and beyond the side edge of a board or shield 52 arranged at the hinged end of the transferring table 49. A coil spring 53 is secured to the arm 50 and to the support 42 for the purpose of holding and returning the transferring table 49 to its initial position ready to receive a nut. The arm 50 extends beyond the guard or board 52 and has serrations 54 adapted to be engaged by the paddles 55 of a feed wheel 56 during the rotation of the latter so as to impart a vibratory motion to the transferring table thereby causing any shells that may fall on the transferring table to fall therefrom and keep the latter in a clean condition. The free edge of the transferring table 49 is disposed in a plane above the lower edge of the table 44 but is adapted to move in alinement with the latter on the rotation of the feed wheel 56 so that the paddles 55 may wipe a nut from the transferring table onto the table 44. The rotation of the feed wheel 56 is in a step by step motion and when one of the paddles 55 engages the transferring table, the same is depressed, and moved in alinement with the table 44 thereby permitting a nut to be readily rolled on to the table 44. The transferring table 49 as soon as disengaged from one of the paddles, the same returns to its initial position by the influence of the spring 53, and the paddle that has just disengaged the transferring table cooperates with the roller 45 in retaining the nut on the table 44. One edge of each of the paddles 55 is curved as illustrated at 57 so as to permit the nut cracking member 10 to slide over the table 44 without any danger of catching on the edge of the paddle. The feed wheel 56 consists of a plurality of radially extending arms 58 to which resilient arms 59 are secured. The resilient arms project beyond the arms 58 which are rigid and support the paddles 55 and are adapted to permit the paddles to be flexed in relation to the arms 58. The feed wheel 56 is secured to a shaft 60 journaled in bearings 61 carried by the base 1 and has journaled on its end a grooved pulley 62. Said end of the shaft 60 also has secured thereto a disk 63 provided with notches 64 adapted to be engaged by a spring pressed pawl 65 carried by the pulley 62. The notched disk 63 and the pawl 65 are adapted to establish a driving connection in one direction between the pulley 62 and the shaft 60. A cable 66 is trained over the grooved pulley 62 and has one end passed over a pulley 67 journaled to the base 1 and said end of the cable is connected to a coil spring 68. The coil spring 68 is in turn connected to a bracket 69 carried by the base 1 and is adapted to permit the cable to move in one direction when the other end of said cable is pulled and is also adapted to return the cable to its initial position. The last named end of the cable is connected to a lever 70 pivoted to an upright 71 carried by the base 1 so that on movement of the lever 70 in one direction a pull is made upon the cable causing rotation of the feed wheel through the notched disk 63 and the pawl 65 and also tensions the spring 68. The spring 68 is adapted to pull the cable 66 in a reverse direction when the lever 70 is permitted to move and said movement of the cable rotates the grooved pulley 62 and the pawl 65 ratchets over the notched disk 63, the shaft 60 being held against rotation by a pawl and ratchet mechanism 72, consequently prevents a reverse of the feed wheel. The lever 70 has pivoted thereto a notched rod 73 adapted to have vertical and lateral sliding movement in a guide 74 carried by the upright 71. The notch 75 of the rod 73 is engaged by the crank 5 on the rotation of the operating shaft 4 to cause said rod 73 to move upwardly and this movement rocks the arm 70 on its pivot pulling upon the cable to cause the feed wheel to make a one-quarter turn. This one-quarter turn of the feed wheel is sufficient to carry a nut upon the transferring table onto the table located between the nut cracking elements. When the crank 5 has turned part way around, the same becomes disengaged from the notch 75 of the lever 73 permitting the spring 68 to return the arm 70 to its initial position and to rotate the pulley 62 in a reverse direction and allow the pawl 65 to obtain another grip on the notched disk 63.

A hopper 76 is supported adjacent to the forward end of the base or the end of the latter opposite to the end where the operating shaft is located and said hopper is supported by the base 1 and also by a leg or standard 77. The bottom wall 78 of the hopper is pivotally mounted as illustrated at 79 and has secured thereto a shoulder 80 adapted to ride over teeth 81 of a bar 82. The bar 82 is slidably mounted on the base 1 and has its forward end curved downwardly and connected to a bar 83 by means of a pin and slot connection 84. The bar 83 is slidably mounted in a guide 85 carried by the base 1 and is connected by means of a pin and slot connection 86 to one end of a pivotally mounted arm 87. The arm 87 is pivoted to the guide 85 and operates within a slot 88 formed in said guide and has its other end disposed through a slot 89 of a plate 90. The arm 87 is prevented from becoming detached from the plate 90 by a pin 91 and the plate 90 is pivotally connected to a connecting rod 92. The plate 90 is provided with a series of openings to receive the pivot which connects the connecting rod to said plate so as to permit said connecting rod to be adjusted on said plate.

The connecting rod is in turn pivotally connected to the crank 5 of the operating shaft 4 so that on rotation of the crank, the plate 90 will be moved forward by said connecting rod and after a slight movement of said plate 90 the arm 87 is rocked upon its pivot causing a sliding movement of the bar 83. The bar 83 being connected to the bar 82 also causes the latter to move and a movement of said bar 82 causes the teeth 81 to vibrate the bottom 78 of the hopper 76 through the shoulder 80. Said movement of the bottom wall 78 of the hopper causes the nuts within the hopper to slide downwardly and be caught within a trough 93 located at the open end of the hopper and supported by the base 1. The trough 93 is of substantially U-shape in cross section and an endless conveyor 94 has its upper run located within said trough for the purpose of carrying nuts that fall thereon towards the transferring table 49. The conveyor 94 is mounted on sprocket wheels 95 carried by shafts 96. The shafts 96 are secured to the base 1. A shoulder or dog 97 is secured to or formed on the rod 83 and is adapted to engage within the links of the endless conveyor so that on movement of said bar 83 in one direction, the endless conveyor will be caused to move to carry the nuts towards the transferring table 49. A reverse movement of the bar 83 carries the dog 97 with the same and owing to its curvature it becomes disengaged from the endless conveyor and obtains a fresh grip upon the latter to again move the endless conveyor on the forward movement of the bar 83 therefore it will be seen that the endless conveyor is given a step by step motion.

A lever 98 is pivoted to a bracket 99 carried by the base 1 and said lever has its lower end connected to the bars 82 and 83 by the pin and slot connection 84 and the other end of said lever is connected to a rack bar 100. The rack bar engages a ratchet wheel 101 and the latter is secured to a controlling wheel 102. The controlling wheel 102 is journaled to a support 103 on the base 1 and is provided with relatively spaced teeth 104 adapted to project into the trough over the upper run of the endless conveyor. The ratchet wheel 101 is engaged by a spring pressed dog 105 for the purpose of preventing the controlling wheel 102 from rotating in a reverse direction. The support 103 is adjustably connected to the base so that the controlling wheel may be raised and lowered for the purpose of permitting large and small nuts to pass under the same on the conveyor and between the teeth 104. The rotation of the controlling wheel 102 is in a reverse direction from the movement of the nuts with the conveyor and is adapted to prevent the nuts from crowding or moving out of the trough too rapidly.

The controlling wheel 102 is adapted to permit only one nut to pass out of the trough at a time and as the nuts one at a time leave the trough they are received by a dumping table 106 which is of substantially U-shape in cross section and has one end hinged to the end of the trough and in a plane slightly below the plane of the upper run of the endless conveyor. An arm 107 of substantially L-shape is secured to the dumping trough 106 and has a spring 108 secured thereto for the purpose of holding said dumping trough in a position to receive the nuts from the conveyor. The spring 108 is attached to one side of the trough 93 and is adapted to permit said trough 106 to swing downwardly when a force is applied upon the latter and to return the trough 106 to its nut receiving position when said force is discontinued. The L-shaped arm 107 has one of its arm portions curved to be engaged by a pivoted member 109 carried on an upturned end 110 of the bar or rod 82 so that on movement of the latter in one direction, the dumping trough is caused to swing downwardly and deposit a nut onto the transferring table 49. The pivoted member 109 is spring supported so as to hold the same in contact with the curved portion of the L-shaped arm 107. An arm 111 is pivoted to a standard 112 on the base 1 and rests upon the curved arm portion of the L-shaped arm 107 and carries at its free end a guard 113 adapted to normally project into the dumping trough when the latter is in its initial position to prevent a nut from passing entirely through said dumping trough when received from the endless conveyor. The guard 113 is swung upwardly by the curved arm portion of the L-shaped arm 107 when the dumping trough 106 is swung downwardly, thereby permitting the nut within the dumping trough to slide onto the transferring table.

The nut cracking elements 10 and 11 have opposed concaved faces 114 and said faces also have formed therein grooves 115. The nut cracking elements 10 and 11 also have bores 116 which extend through said cracking elements and the inner ends of the grooves 115 communicate therewith, while the outer ends of said grooves open outwardly through the peripheries of said cracking members. The periphery of the nut cracking member 10 has formed therein grooves 117 adapted to receive guides 118 which project beyond the concaved face 114 of said nut cracking member 10 and are beveled as illustrated at 119 to engage a nut. The guides 118 are secured to the nut cracking member 10 by bands or rings 120. The concaved faces 114 of the nut cracking members 10 and 11 are adapted to engage the ends of a nut when said nut cracking members move towards each other and the ends of the nuts are received by the bores 116 and caused to break off and also the grooves 115 are adapted to cause the shell of the nut to crack endwise in several places.

The ends of the shell of the nut are liable to become lodged within the bores 116 after the cracking of the nut and to remove such portions of the shell from the nut cracking members 10 and 11, plungers 121 and 122 are provided and the plunger 121 is pivoted to arm 35 and extends through the bore of the nut cracking element or member 11 while the plunger 122 extends through the bore of the nut cracking member 10 and is provided with a laterally extending arm 123 which is secured to the base 1 so that on reciprocation of the nut cracking member 10 the plunger will be caused to eject any particles of shell that may be within the bore of said member 10. The plunger 121 projects beyond the concaved face 114 of the nut cracking member 11 when the latter is at rest and consequently has ejected any particles of shell that may have lodged within the bore of said member 11. The plunger 8 where the same forms onto the nut cracking member 10 is provided with a slot to permit the lateral arm 123 of the plunger 122 to extend therethrough and to permit reciprocation of the plunger and also the nut cracking member 10.

Weights 124 and 125 are disposed above the nut cracking members 10 and 11 and over the table 44 for the purpose of cooperating with the feed wheel, roller 45, table 44 in supporting a nut in a position between the opposing ends of the nut cracking members 10 and 11. The weight 125 is pivoted to an arm 126 carried by the bearing which supports the plunger 8 while the weight 124 is hinged or pivoted to the nut cracking member 11. The weights 125 and 124 are limited in their downward movement by the nut cracking members 10 and 11 when the table 44 is not supporting a nut or when supporting a cracked nut.

The serrations 54 engaged by the paddles of the feed wheel causes a slight vibration of the transferring table 49, sufficient to cause a nut to properly position itself upon said table when received from the dumping trough 106.

For convenience in describing the operation of this machine, the front and rear ends thereof are designated A and B respectively and to give a clear understanding, it is assumed that the hopper is filled with nuts and a nut is located in the dumping trough 106. The operator turns the actuating lever in the direction indicated by the arrow in Figure 1 and as soon as the crank 5 starts to turn from the position shown in Figure 2, the connecting rod 92 moves towards the front end A of the machine, carrying with the same, the plate 90. A slight movement of the plate 90 is had before the arm 87 is rocked on its pivot and on the arm 87 being rocked, the rod 83 is moved towards the rear end B of the machine and the dog 97 thereof ratchets in relation to the conveyor and obtains a fresh grip on the latter. The rod 82 is also moved towards the rear end B of the machine and causes a vibration of the bottom 78 of the hopper 76 to cause the nuts in the latter to fall onto the conveyor within the trough by the teeth 81 moving in relation to the shoulder 80. The same movement of the rod 82 causes the spring supported member 109 to shove the L-shaped arm 107 and tilt the dumping trough 106, so that the nut therein, will slide onto the transferring table 49. After a certain movement of the dumping trough 106 or when reaching its fullest dumping position, the member 109 becomes disengaged from the curved end of the L-shaped arm 107 and the dumping trough returns to its nut receiving position by the influence of the spring 108. During the movement of the dumping trough 106 into dumping position, the curved end of the L-shaped arm 107 raises the arm 111, and consequently elevates the guard 113 to permit the nut to slide freely from the dumping trough onto the transferring table 49. The movement of the rods 82 and 83 towards the rear end B of the machine, causes the lever 98 to rock and pull the rack bar 100 towards the front end A of the machine. The teeth of the rack bar 100 during said movement, ratchets over the teeth on the controlling wheel 102 and the latter is held stationary by the pawl 105 engaging the teeth of the ratchet wheel 101. With a nut now positioned on the transferring table 49, the crank has become engaged with the notch 75 of the rod 73 and raises the latter upwardly and rearwardly to impart motion to the arm 70. The movement of the arm 70 causes a pull on the cable 66 in one direction and against the tension of the spring 68. The cable 66 rotates the feed wheel 56 approximately one-quarter of a revolution, so that one of the paddles 55 thereof, first rides over the serrations 54 of the arm 50 to vibrate the transferring table 49 and cause the nut thereon to become properly positioned in case the nut happen not to fall on the table 49 correctly. A further movement of the feed wheel 56, the respective paddle depresses the transferring table 49 into a position to aline with the table 44 to allow the nut to be swept onto said table 44 and held thereon by the paddle stopping at the inner edge of said table 44. The nut also is engaged by the roller 45 and the weights 124 and 125 so as to be held in the path of movement of the nut cracking members 10 and 11. The respective paddle now having passed or become disengaged from the transferring table 49, the latter returns to its nut receiving position by the spring 53 to prevent any particles of shell from falling thereon during the cracking of the nut and also be in a position to receive the next nut from the dumping trough 106. The rod 73 is limited in its rearward movement by the guide 74 so that the notch 75 thereof soon becomes disengaged from the crank and the rod returned to its initial position by the influence of the spring 68', to permit the cable 66 to move in a reverse direction by the spring 68. The reverse movement of the cable causes the pawl 65 to obtain another grip on the notched disk 63 and the feed wheel 56 remains stationary by the pawl and ratchet mechanism 72 holding the same. The crank 5 having turned sufficient to become disengaged from the rod 73, it now moves the connecting rod 92 towards the rear end B of the machine causing a forward movement of the rods 83, and 82 and a rearward movement of the rack bar 100. The forward movement of the rod 82 again vibrates the bottom 78 of the hopper 76 and also positions the spring supported member 109 as shown in Figure 2 to again be ready to actuate the dumping trough 106. The forward movement of the rod 83 advances the endless conveyor through the dog 97 and causes another nut to pass into the dumping trough 106. The rearward movement of the rack bar 100 being simultaneous with the movement of the conveyor, rotates the controlling wheel 102 and the teeth 104 thereof permit only one nut to pass into the dumping trough while the other nuts that may be crowding towards the outlet of the trough are kicked back. The rotation of the controlling wheel 102 is in a reverse direction from the direction in which the conveyor moves.

The beginning of the rotation of the operating handle 6 does not effect the plunger 8 owing to the flat C of the cam 7 being opposite thereto, so as to permit operation of the feeding mechanism to place the nut onto the table 44 and to eject the cracked nut therefrom prior to the operation of the nut cracking members 10 and 11. It will be understood that the paddle of the feed wheel which is in advance of the paddle that is in the act of placing a nut on the table 44 ejects the cracked nut by raising the weights 124 and 125 and depressing the roller 45. The roller 45 returns to its initial position by the spring 47 as soon as the cracked nut is ejected. The plunger 8 moves forwardly after the flat C of the cam 7 has moved beyond the end of said plunger, consequently advancing the nut cracking member 10 which moves the nut on the table 44 into engagement with the nut cracking member 11 and the latter recedes a short distance, causing a pull on the rod 14 which swings the depending arm 15 downwardly on its pivot. Said movement of the arm 15, elevates the long end of the catch member 23 into engagement with one of the teeth 25 of the plate 26 and locks the nut cracking member 11 against a further receding movement for a short length of time. The nut cracking member 11 now offers the necessary resistance to the oncoming nut and nut cracking member 10 so that the nut will be cracked. After the locking of the nut cracking member 11 and a further advancement of the nut cracking member 10, the latch member 23 becomes disengaged from the plate 26 and frees the nut cracking member 11 to allow the same to recede as the nut cracking member 10 advances, thereby preventing squashing or over cracking of the nut as the nut cracking member 10 must make its full stroke owing to the cam 7 making a complete turn. It is to be understood that when the cracking member 11 is locked against receding movement and the plate 26 advancing with the nut cracking member 10 on the plunger 8, the block 21 of the latch 20 swings on its pivot and after a certain pivotal movement thereof, the latch member 23 becomes disengaged from the depressing arm 15 and the spring 20' pulls the tension member 28 from an engagement with the teeth of the plate 26 which allows the cracking member 11 to recede. After the highest face of the cam 7 passes the plunger 8, the latter and the nut cracking member 10 move in a reverse direction by the action of the spring 34 and arrive in their initial position just prior to the operating lever 6 arriving at its initial position.

During the cracking of the nut, the ends of the shell are cut off by the cutting edges defined by the bores and concaved faces of the cracking members 10 and 11 and the shell of the nut is also caused to crack endwise in several places by the cutting edges defined by the grooves 115. The ends of the shell become lodged in the bores 116 and to eject the ends of the shells from said bores, the plungers 121 and 122 are provided. The plunger 122 being rigidly mounted on the base 1 does not move with the cracking member 10, but is adapted to protrude a slight distance beyond the nut engaging face of said member 10 when the latter is at rest, so that any pieces of shell which may be in the bore will be ejected. The lever 39 riding against the cam 7 causes the arm 37 with the aid of the spring 41 to recede with the cracking member 11 and when the latter becomes locked to offer the necessary resistance against the nut to crack said nut, the arm 35 continues to recede by the action of the cam and moves the plunger 121 therewith and when the cracking member 11 is released for further receding movement it moves with the nut cracking member 10 so that when the latter reaches its normal position, the nut cracking member 11 also reaches its normal position and the cam permits the return of the arm 35 and the plunger 121 then ejects the end of the shell that may be lodged in the bore of said cracking member 11 by protruding a short distance beyond the end of the bore at the concaved end of said cracking member 11. When the cracking member 10 returns to its initial position, the cam 7 returns the cracking member 11 to its initial position through the lever 39, rod 38 and the arm 35. The return of the cracking member 11 to its initial position elevates and returns the depressing lever 15 to its initial position over the short end of the catch member 23. By turning the adjusting screw 30, the position of the block 21 of the catch 20 may be varied for the purpose of regulating the amount of resistance offered to the nut cracking member 11.

From the foregoing description taken in connection with the accompanying drawings, it will be seen that one complete revolution of the operating shaft 4 by the operating lever 6 will eject the nut already cracked on the table 44 and place another nut thereon and crack the same and be ready to be ejected on the next revolution of the operating shaft 4.

While I have shown and described the preferred embodiment of my invention, it will be understood that minor changes in construction, combination and arrangement of parts may be made without departing from the spirit and scope of the invention as claimed.

Having thus described my invention what I claim is:—

1. A nut cracking machine comprising a base, nut supporting means on said base, a nut cracking member slidably mounted on said base and adapted to move across the nut supporting means, a second nut cracking member pivoted to said base and located in the path of movement of the first named nut cracking member and adapted to recede under the influence of said first nut cracking member, a catch carried by said base, a locking plate carried by and movable with the first nut cracking member, and means actuated by the receding movement of the second nut cracking member to move the catch into engagement with the locking plate to cause the second named nut cracking member to offer resistance against the first nut cracking member to crack a nut on the nut supporting means.

2. A nut cracking machine comprising a base, a nut supporting means carried by said base, a slidably mounted nut cracking member on said base, means for actuating said member, a second nut cracking member pivoted to said base and arranged within the path of movement of the first named nut cracking member and adapted to recede under the influence of the first nut cracking member, a catch carried by said base, an arm secured to the first named nut cracking member, a toothed plate carried by said arm, and means affected by the receding movement of the second nut cracking member to actuate the catch into engagement with the toothed plate to cause the second named nut cracking member to offer resistance against the first named nut cracking member to crack a nut on said nut supporting means.

3. A nut cracking machine comprising a base, nut supporting means carried by said base, a nut cracking member slidably mounted on said base, means for actuating said member, a second nut cracking member pivoted to said base and arranged within the path of movement of the first named nut cracking member, a toothed plate secured to the first named nut cracking member, a block pivoted to the base, a latch member pivoted to said block, tension means connected to said block, tension means connected to the block and to the latch member, and means affected by the receding movement of the second mentioned nut cracking member to depress one end of the latch member and move its other end into engagement with the toothed plate to lock the second named nut cracking member against receding movement so that the same will offer resistance against the first nut cracking member to crack a nut on said supporting means, said toothed plate after a predetermined movement adapted to become disengaged from the latch member and free the second named nut cracking member for further receding movement under the influence of the first named nut cracking member.

4. A nut cracking machine comprising a base, nut supporting means on said base, a nut cracking member slidably mounted on said base, means for actuating said member, a second nut cracking member pivoted to said base and arranged within the path of movement of the first nut cracking member and adapted to recede under the influence of said first mentioned nut cracking member, a toothed plate secured to the first named nut cracking member, a block pivoted to said base, an adjusting means for said block, a tension means connected to said block, a latch member pivoted to said block, tension means connected to one end of the latch member and to the block, a depressing arm pivoted to said base, and a rod pivoted to said depressing arm and to the second named nut cracking member to move the catch member into engagement with the toothed plate after a predetermined receding movement of said second mentioned nut cracking member to cause the latter to offer resistance against the first nut cracking member to crack a nut on said nut supporting means.

5. A nut cracking machine comprising a base, nut supporting means carried by said base, a slidably mounted nut cracking member on said base, means for actuating said member, a second nut cracking member pivoted to said base and arranged within the path of movement of the first named nut cracking member and adapted to recede under the influence of the latter, a spring controlled catch carried by said base, means for regulating the catch, a toothed plate carried by the first named nut cracking member, a depressing arm pivoted to said base, a rod connected to the depressing arm and to the second named nut cracking member to cause the catch to engage the toothed plate after a predetermined receding movement of said second nut cracking member to cause the same to offer resistance against the first named nut cracking member to crack a nut, said toothed plate adapted to move with the first mentioned nut cracking member and after a predetermined time to become disengaged from the catch and permit the second named nut cracking member to recede under the influence of the first named nut cracking member to prevent over cracking of the nut.

6. A nut cracking machine comprising a base, means for supporting a nut on said base, a nut cracking member slidably mounted on said base, a cam for actuating said member, a second nut cracking member pivoted to said base and adapted to recede under the influence of the first named nut cracking member, means for locking the second named nut cracking member against receding movement for a predetermined length of time, nut cracking faces carried by said nut cracking member, said nut cracking members having bores opening through said faces, a plunger carried by said base and adapted to eject pieces of nut shells from the bore of the first named nut cracking member when the latter is at rest, a plunger in the bore of the second named nut cracking member, an arm pivoted to said base, tension means connected to said arm, means connecting said arm to the cam to cause said arm to recede with the second named nut cracking member and during the working stroke of the first named nut cracking member, said second plunger adapted to said arm and adapted to be retracted within the bore of the bore of the second named nut cracking member by the receding movement of said arm and when said second nut cracking member is locked against receding movement and adapted to protrude beyond one end of the bore after the second named nut cracking member has been freed from a locked position.

7. A nut cracking machine comprising a base, an operating means carried by said base, a nut supporting table on said base, a transferring table carried by said base, means for feeding nuts one at a time from the hopper to the transferring table and actuated by said operating means, and means actuated by the operating means for placing the nut on the transferring table onto the nut supporting table and adapted to hold the nut on the latter.

8. A nut cracking machine comprising a base, an operating means carried by said base, a nut supporting table on said base, a hopper, a transferring table, means for feeding nuts from the hopper to the transferring table one at a time, and means for placing the nut on the transferring table onto the nut supporting table, and holding the nut on the latter during the cracking of the nut and adapted to eject the cracked nut from the nut supporting table after the nut has been cracked.

9. A nut cracking machine comprising a base, an operating means on said base, an inclined nut supporting table on said base, a hopper carried by said base, a transferring table carried by said base, means for depositing nuts one at a time on the transferring table from the hopper, a feed wheel carried by said base and adapted to move a nut from the transferring table onto the nut supporting table and hold the same on the latter during the cracking of the nut and to eject the nut from the nut supporting table after the nut has been cracked.

10. A nut cracking machine comprising a base, an operating means on said base, an inclined nut supporting table on said base, a hopper carried by said base, a pivotally mounted transferring table carried by said base, means actuated by the operating means to feed nuts one at a time from the hopper to the transferring table, a paddle wheel journaled to said base, means for operating the paddle wheel in a step by step movement from the operating means to depress the transferring table into a plane with the nut supporting table and to transfer the nut from the transferring table onto the nut supporting table and hold the nut on the nut supporting table during the cracking of the nut and to eject the cracked nut from the nut supporting table, and means for returning the transferring table to a nut receiving position when disengaged from the feed wheel.

11. A nut cracking machine comprising a base, an operating means carried by said base, a flexible and inclined nut supporting table carried by said base, a hopper carried by said base, a transferring table carried by said base and capable of pivotal movement, means actuated by the operating means to feed nuts one at a time from the hopper to the transferring table, a feed wheel journaled to said base, means for imparting a step by step motion to the feed wheel from the operating means, paddles carried by said feed wheel, one of said paddles adapted to depress the transferring table into a plane with the supporting table and move the nut from the transferring table onto the nut supporting table and hold the nut on said nut supporting table, another of said paddles adapted to eject a cracked nut from the nut supporting table during the movement of another nut from the transferring table onto the nut supporting table, means for returning the transferring table to a nut receiving position after being disengaged from a paddle.

12. A nut cracking machine comprising a base, an operating means on said base, an inclined nut supporting table on said base, a hopper carried by said base, a pivotally mounted transferring table carried by said base, means actuated by the operating means to feed nuts one at a time from the hopper onto the transferring table, a feed wheel carried by said base, a plurality of paddles carried by said feed wheel, means for imparting a step by step movement to the feed wheel by the operating means, one of said paddles adapted to eject a cracked nut from the supporting table on movement of the feed wheel, another of said paddles adapted to depress the transferring table and move the nut thereon onto the nut supporting table and hold said nut onto said nut suporting table, and tension means for returning the transferring table to a nut receiving position when disengaged from the last named paddle.

13. A nut cracking machine comprising a base, an operating means carried by said base, an inclined nut supporting table carried by said base, a hopper carried by said base, a pivotally mounted transferring table carried by said base and normally disposed in a plane above the nut supporting table, tension means connected to said transferring table for normally holding the latter in a nut receiving position, means actuated by the operating means to move nuts one at a time from the hopper to the transferring table, a feed wheel journaled to the base, means for imparting a step by step movement to the feed wheel from the operating means, flexible paddles carried by said feed wheel and relatively spaced, one of said paddles adapted to eject a cracked nut from the nut supporting table, another paddle adapted to depress the transferring table into a plane with the nut supporting table and to move the nut on the transferring table onto the nut supporting table and hold said nut onto the last named table, an arm formed on said transferring table and having serrations adapted to be engaged by one of the paddles during each movement of the feed wheel to vibrate the transferring table.

14. A nut cracking machine comprising a base, an operating means carried by said base, a nut supporting table carried by said base, a hopper carried by said base, a trough for said hopper, an endless conveyor in said trough, a transferring table carried by said base, means moving the conveyor in a step by step motion by the operating means to carry nuts one at a time from the hopper to the transferring table, and means for moving the nut from the transferring table to the nut supporting table and to eject a cracked nut from the nut supporting table.

15. A nut cracking machine comprising a base, an operating means carried by said base, a nut supporting table on said base, a hopper carried by said base, a transferring table carried by said base, a dumping trough between the transferring table and the hopper, means actuated by the operating means to move nuts one at a time from the hopper into the dumping trough, means actuated by the operating means to tilt the dumping trough to permit the nut therein to fall onto the transferring table, and means actuated by the operating means to move the nut from the transferring table onto the nut supporting table and to eject the cracked nut from the nut supporting table.

16. A nut cracking machine comprising a base, an operating means carried by said base, a nut supporting table carried by said base, a hopper carried by said base, a trough base, a hopper carried by said base, a trough in communication with the hopper, an endless conveyor mounted in said trough, a transferring table, a dumping trough located between the first named trough and the transferring table, means for imparting a step by step movement to the conveyor to move nuts one at a time from the hopper into the dumping trough, means actuated by the operating means to tilt the dumping trough to deposit a nut therefrom onto the transferring table, and means actuated in a step by step movement from the operating means to move a nut from the transferring table onto the nut supporting table and to eject a cracked nut from the latter.

17. A nut cracking machine comprising a base, an operating means carried by said base, a nut supporting table on said base, a base, a nut supporting table carried by said hopper, a transferring table carried by said base, a dumping trough arranged between the hopper and the transferring table, tension means normally supporting the dumping trough in a nut receiving position, means actuated by the operating means to place nuts one at a time in the dumping trough from the hopper, means actuated by the operating means to tilt the dumping trough to deposit the nut therein onto the transferring table and adapted to permit the dumping trough to return to its initial position after depositing the nut onto the transferring table, means actuated by the operating means to move the nut from the transferring table onto the nut supporting table and to eject a cracked nut from the latter.

18. A nut cracking machine comprising a base, operating means carried by said base, a nut supporting table on said base, a hopper carried by said base, a transferring table carried by said base, a trough arranged in communication with the hopper, a dumping trough between the first named hopper and the transferring table, means for moving nuts one at a time from the first named trough into the dumping trough, means for preventing the nuts within the hopper from crowding into the dumping trough, means actuated by the operating means to tilt the dumping trough to permit the nut therein to fall onto the transferring table, means actuated by the operating means to move the nut on the transferring table onto the nut supporting table and to eject a cracked nut from the nut supporting table.

19. A nut cracking machine comprising a base, operating means carried by said base, a nut supporting table on said base, a hopper carried by said base, a transferring table carried by said base, a dumping trough between said hopper and the transferring table, means actuated by the operating means to feed nuts one at a time from the hopper to the trough, a controlling wheel actuated in the hopper during the operation of the last named means to prevent nuts from passing more than one at a time into the dumping trough, means actuated by the operating means to tilt the dumping trough to deposit the nut therein onto the transferring table, means actuated by the operating means to move the nut on the transferring table onto the nut supporting table and eject the cracked nut from the nut supporting table.

In testimony whereof I affix my signature in presence of two witnesses.

HENRY E. PAOLUCCI.

Witnesses:
L. W. GOODWIN,
E. E. GOODWIN.